Nov. 21, 1950  K. F. THORNTON ET AL  2,530,669
EXTRUSION APPARATUS
Filed Nov. 30, 1944
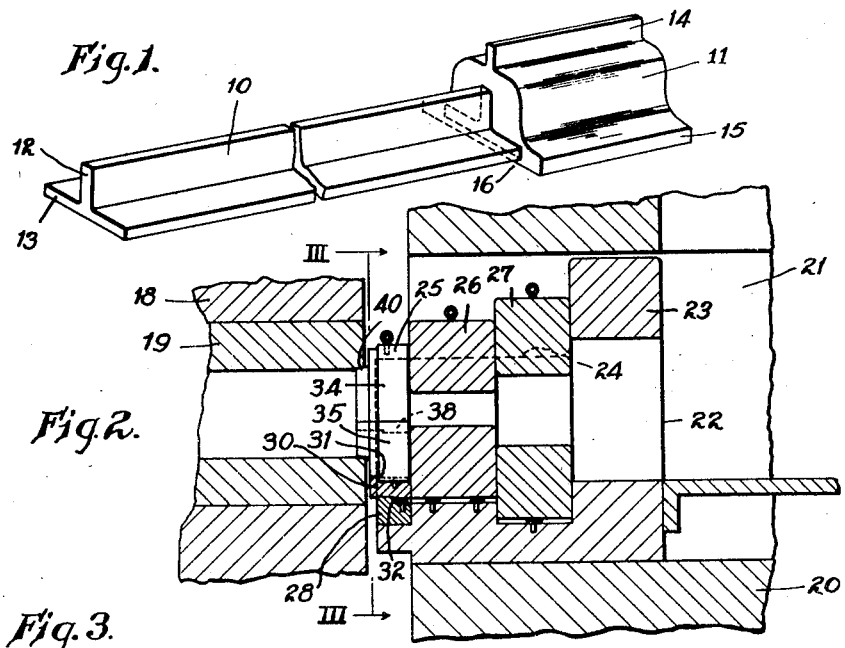
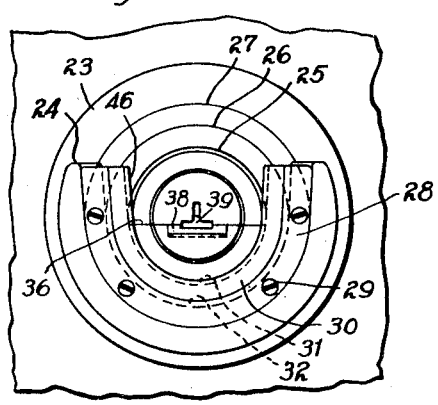
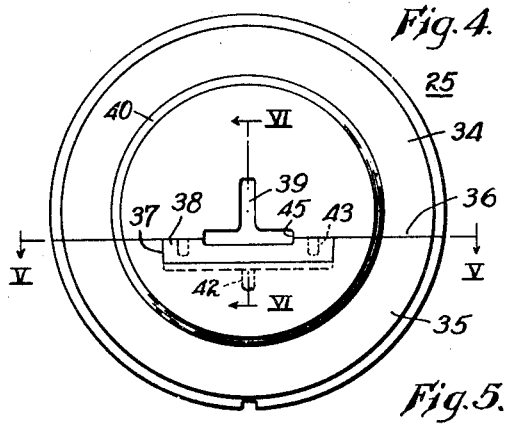
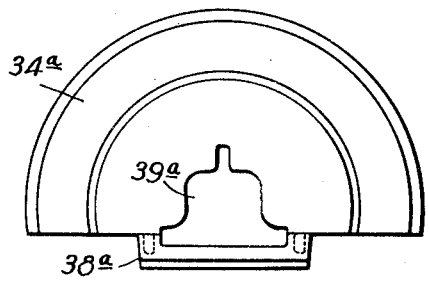
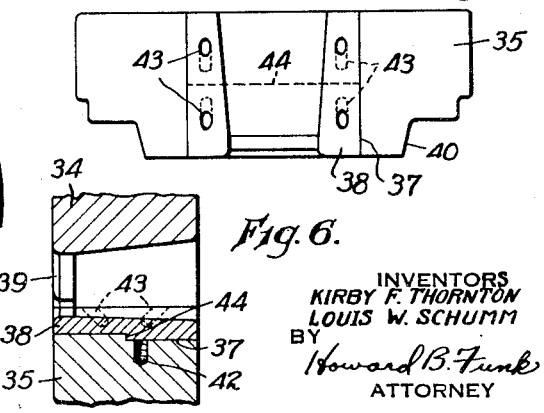
INVENTORS
KIRBY F. THORNTON
LOUIS W. SCHUMM
BY
Howard B. Funk
ATTORNEY Patented Nov. 21, 1950

2,530,669

UNITED STATES PATENT OFFICE 2,530,669

EXTRUSION APPARATUS

Kirby F. Thornton and Louis W. Schumm, New Kensington, Pa., assignors to Aluminum Company of America, Pittsburgh, Pa., a corporation of Pennsylvania Application November 30, 1944, Serial No. 565,870

2 Claims. (Cl. 207—17)

This invention relates to the extrusion of metal to produce extruded shapes and in particular to extrusion tool or die mechanism especially suitable for use in the production of extruded structural shapes having a step or a series of steps along its length, and hereinafter termed "stepped extrusions."

An object of the invention is to provide an improved die organization for metal extrusion utilizing dies of split construction by means of which stepped extrusions having no surface common to the small and the large sections thereof may be practically and economically made.

Another object of the invention resides in the provision of a multi-part extrusion die structure which shall be effective for materially reducing the time and labor involved in making the required die change for producing stepped extrusions of the character referred to, and wherein the parting line of the dies shall be terminated at vertical surfaces of the contour-controlling die apertures to prevent the formation of wire edges.

A further aim of the invention is to provide extrusion die mechanism of multi-part construction for the purpose stated which is of generally simplified and improved form, which requires the removal and substitution of only a relatively light die part from beneath the first extruded portion of a stepped extrusion for enabling change in the level and contour of the underside of a subsequently extruded portion, which affords a material savings in die material and in die costs, and in which the said light die part is held in operative position in a pressure sustaining lower die part by a readily removable upper die part.

Other objects and novel features of the invention will become manifest from the following detailed description taken in conjunction with the drawings illustrating a preferred embodiment wherein:

Fig. 1 is a perspective view of one form of stepped extrusion which may readily be made by utilization of the invention;

Fig. 2 is a longitudinal sectional view of a portion of an extrusion press incorporating the invention;

Fig. 3 is a view taken on the line III—III of Fig. 2;

Fig. 4 is a face view, to an enlarged scale, of the multi-part die structure of this invention through which the metal of a billet is first extruded in the manufacture of the stepped extrusion of Fig. 1;

Figs. 5 and 6 are views taken respectively on lines V—V and VI—VI of Fig. 4; and Fig. 7 is a face view of top and bottom die parts which replace corresponding parts of the die of Fig. 4 for formation of the stepped or enlarged portion of the extrusion of Fig. 1.

In Fig. 1 of the drawing, there is illustrated a form of stepped extrusion which is typical of those used extensively in the aircraft industry for the production of such structural members as tapered wing spar caps with integral attach fittings, for example. The tapered spar is formed from the elongate small section 10 of the extrusion and the attach fitting from the relatively short, stepped or enlarged section 11 thereof. The section 10 of the extrusion is of such cross section as to provide vertical and horizontal flanges 12 and 13 along its length, while the stepped end 11 is of considerably heavier cross section with wider and deeper flanges 14 and 15. The T-shaped section shown is exemplary of the required flanged form. It will be noted that the depth of section 11 is much greater than that of section 10, and that section 11 is stepped down relative to section 10, as shown at 16, with the result that the horizontal neutral axes of the two sections are more nearly coincident as is highly desirable in many cases.

Referring now to Figs. 2 and 3, the numeral 18 represents the billet cylinder of an ordinary known type of hydraulic extrusion press having the usual liner 19 in its bore, and the numeral 20 represents the front platen of the press through the bore 21 of which the tool holder or carrier 22 is translatable toward and from the cylinder in the usual manner. The tool holder 22 is provided with an apertured back wall 23 and an open top, cylindrical barrel 24 facing the billet cylinder for the vertical reception of die 25 and die back-up blocks 26 and 27, the latter also being apertured for free passage of the extruded metal issuing from the die. To adapt the die holder for reception of dies of various sizes, it preferably is provided with an open top or U-shaped die support 28 which suitably is secured thereto, as by means of screws 29, and in turn carries a similarly shaped adapter 30 in which the die 25 is seated. Interlocking peripheral flanges or shoulders provided on the die 25 and the adapter 30, as indicated by the numeral 31, and similar ones formed on the adapter and the die support 28, as indicated by the numeral 32, serve to hold the die and its adapter against forward shifting out of the die holder.

The die 25, adapter 30, and back-up blocks 26 and 27 are provided with bottom keyways for cooperation with aligning keys, as shown, whereby the parts when assembled in the tool holder 22 will be accurately aligned relatively to each other and to the billet cylinder, and held against rotation about the extrusion axis while permitting slight axial movement of the parts into solid pressure-resisting relationship when the press tools and the billet cylinder are brought into extruding position. The press tools are locked in such extruding position by means of the usual locking member, not shown, carried by the platen 20 and movable vertically into and out of locking position behind the tool carrier 22.

The die 25 is of multi-part construction and comprises complemental top and bottom segments or members 34 and 35 which when brought together form an annular split die, as shown in Fig. 4, having a horizontal parting plane 36 which preferably is located below the center of the die, so that in a semi-circular die holder the top die part will be adequately confined against shifting sidewise. The meeting faces of the die parts 34 and 35 are flat and a through recess 37 is formed in the top or meeting face of the bottom die part 35 for the reception of a replaceable die insert member 38 whose upper surface preferably is flush with that of the bottom die member so that the parting plane 36 will be devoid of steps from the die aperture to the outer periphery of the die. This feature simplifies the work of shaping the die parts along their meeting faces. The width of the insert 38 and of the recess 37 preferably is greater than the width of the shape to be extruded, so that the insert will have marginal areas at its upper side which the top die part 34 will engage for normally holding the insert seated in the recess. The die aperture, indicated by the numeral 39, is formed partly in the top die member 34 and partly in the insert 38, and as here shown, it is so shaped as to produce the small T-shaped section 10 of the stepped extrusion above described upon extrusion of metal therethrough. The insert is accurately fitted in the recess 37, so that radial extrusion pressures will be sustained by the bottom member 35.

The die parts 34 and 35 are formed with a chamfered or tapered front or cylinder-facing end portion of a reduced diameter providing a tapered annulus 40 which projects forwardly of the tool holder 22 for entering the bore of the liner 19 and bearing against a complementary surface formed thereon. A metal seal is thereby assured when the cylinder and tool are in extruding position, and also the die parts are positively clamped or confined against radial separation by the encircling relation of the billet cylinder with the conical bearing surface on the front end of the die assembly as is clearly shown in Fig. 2.

From the foregoing description of the structure, it will be appreciated that with the tool carrier 22 moved away from the billet cylinder or rearwardly to a position clear of the front platen 20, all the tools to be carried thereby are simply lowered into position in the carrier by means of the usual tool handling hoist. Handling of the heavy bottom die member 35 is facilitated by temporary use of an eye bolt screwed into threaded hole 42, which hole is covered by the insert 38 when it is placed in the recess 37. A pair of holes 43 inclined downwardly towards each other is provided in the top of the insert near each side thereof, and the prongs of a suitable spring type hand tongs may be inserted in either pair of holes 43 for gripping and manipulating the insert in its heated condition safely. These holes are offset from that portion of the die aperture which is formed in the insert 38 and are covered by the overlying top die part 34.

The side walls of the recess 37 and those of the insert 38 preferably are inclined slightly to afford vertical relief or draft and thereby facilitate disengagement at these sides when the insert is to be raised and removed from the recess. The insert is locked against forward axial shifting relative to the bottom die member 35 by engagement of a transverse vertical shoulder wall formed in the bottom of the recess 37 with a similar shoulder wall formed on the underside of the insert 38, as indicated by the numeral 44. Other suitable means, such as short dowel pins carried by one part and fitting in holes in the other part may be used in lieu of the shoulders 44. With the transverse shoulders 44 engaged, the front and rear faces of the insert 38 are flush with those of the bottom segment 35. Under extrusion pressure insert 38 is locked against movement rearwardly by its engagement with the back-up block 26, thereby assuring accurate mating of the split surfaces of the die aperture 39 in the axial direction during extrusion.

At the die aperture 39, the parting line 36 terminates at the vertical bearing surfaces 45 defining the widest part of the shape to be extruded, in this case the horizontal flanges 11 of the T-shape section 10; and vertically, it is to be noted, the parting line is located at a level dividing the vertical bearing surfaces 45 or remotely from edge or corner-defining bearing surfaces so as to avoid formation of "wire" edges on the extrusion. Accurate mating or registry of the split vertical surfaces 45 is automatically effected by peripheral engagement of the die members 34 and 35 at both sides with the inner wall of the die adapter 30, the die parts being guided during lowering thereof into the adapter by the upwardly and outwardly flaring throat walls 46 of the adapter.

With the billet cylinder and extrusion tools in extruding position as shown in Fig. 2, pressure is exerted on a metal billet in the cylinder 18 by means of the press ram, not shown, to force the metal through die orifice 39 and thereby produce the small section 10. After the desired length of section 10 is produced, the extrusion operation is interrupted. The tool assembly is then unlocked and withdrawn or pulled back from the press cylinder to an exposed position at the front platen 20, all parts of the die being thereby pulled free of the billet in the cylinder and moved along the extruded length 10.

In case the extruded length 10 extends past the die when the tool assembly is thus retracted, a die change is effected in the following manner. The top part 34 of the die is removed from the die holder by lifting it through the throat 46, thereby exposing the holes 43 in the die insert 38. One member of the press crew engages the insert 38 with his hand tongs and another man raises the extrusion far enough to allow the insert to be lifted clear of the shoulder 44 and moved forwardly out of the recess 37 in the bottom die part 35. Then, with the extrusion still raised, another insert 38a (Fig. 7) is moved endwise into the recess 37 and seated therein. This completes the change in the bottom die, whereupon another top die element 34a of Fig. 7 is lowered through the throat 46 and seated on the bottom die 35 and its new insert 38a, thus completing the die change. The tool holder is then moved into locked and sealed relationship with the billet cylinder 18 for continuation of the extrusion operation.

In Fig. 7 the die parts 34a and 38a are shown in the relation they will have when assembled with the common bottom die part 35 and they, of course, are identical to the die parts 34 and 38 except for the difference in contour of the die aperture 39a formed thereby which is designed in this case for the production of the large section 11 upon extrusion of the metal in the billet cylinder therethrough.

After completing the second stage extrusion operation by which the large section 11 is produced, the press tools are again run out of the press bringing with them the butt end of the extrusion billet and the dummy block. The butt is then sheared off and the extrusion moved out of the die in the usual manner. The die parts 34 and 38 may then be substituted in readiness for the extrusion of a succeeding billet.

Since changing of die parts at both sides of the die parting line is efficiently and effectively provided for, it is to be appreciated that not only may the depth of the section at each step be increased, as desired, at both sides of the parting line, but that the contours at both sides of the parting line may be changed and that a series of stepped portions along the length of a stepped extrusion may be provided, as desired. Obviously, the invention is not restricted to the production of the specific form of extrusion shown, and various modifications and changes may be resorted to to obtain the advantages of the invention without departing from the spirit of the invention as defined in the appended claims.

What is claimed is:

1. In a horizontal extrusion press having an axially translatable tool carrier provided with an open top die support, a die in said support adapted for enabling the production of stepped extrusions, said die comprising complemental top and bottom die members, an axially extending and forwardly removable insert member interposed therebetween in confined and supported relation, with a die aperture formed partly in said top member and partly in said insert member, and a locking connection between said insert member and said bottom member to prevent forward removal of said insert member until it is first raised slightly with respect to said bottom member, said top die and insert members being replaceable by others defining an enlarged die aperture after a portion of a billet has been extruded.

2. Extrusion die structure for use in the production of a stepped extrusion, comprising a common die part adapted to be peripherally supported in vertical position below a horizontal extrusion axis and having an elongated recess in its top face extending parallel to said axis, a top die part complemental with said bottom die part to form an annular split die, said top die part being movable vertically into and out of seating engagement on said top face when the die is axially separated from a billet to be extruded therethrough, an insert member confined in said recess in underlying contacting relation to said top die part, with a die aperture formed partly in said top die part and partly in said insert member defining the exterior configuration imparted to the metal from said billet extruded therethrough to a length greater than said axial separation distance, said recess being open to the front, metal entering face of said die for forward withdrawal of said insert from said recess and along the underside of the overlying extrusion, for replacement.

KIRBY F. THORNTON.
LOUIS W. SCHUMM.

REFERENCES CITED

The following references are of record in the file of this patent:

UNITED STATES PATENTS

| Number | Name | Date |
| --- | --- | --- |
| 369,594 | Dalzell | Sept. 6, 1887 |
| 2,172,867 | Dreyer | Sept. 12, 1939 |

FOREIGN PATENTS

| Number | Country | Date |
| --- | --- | --- |
| 544,114 | Great Britain | Mar. 27, 1942 |